United States Patent [19]

Minelli

[11] Patent Number: 4,899,458
[45] Date of Patent: Feb. 13, 1990

[54] PROCESS AND DEVICE FOR CENTERING A GUIDE MANDREL

[75] Inventor: Italo Minelli, Pfaffikon, Switzerland

[73] Assignee: Minelli AG, Switzerland

[21] Appl. No.: 218,690

[22] Filed: Jul. 13, 1988

[30] Foreign Application Priority Data

Jul. 21, 1987 [CH] Switzerland .......................... 2770/87

[51] Int. Cl.⁴ ............................................... G01B 5/25
[52] U.S. Cl. ........................................ 33/644; 33/520; 408/115 R; 408/83.5; 408/708
[58] Field of Search ................. 33/644, 645, 632, 520, 33/634; 408/1 R, 115 R, 83.5, 74, 75, 708

[56] References Cited

U.S. PATENT DOCUMENTS

| 1,923,847 | 8/1933 | Seelert | 408/83.5 |
| 2,779,040 | 1/1957 | Scarff | 33/644 |
| 3,157,068 | 11/1964 | Rickert | 408/75 |
| 3,522,758 | 8/1970 | Minelli et al. | 408/83.5 |
| 3,764,204 | 10/1973 | Kammeraad | 408/75 |
| 3,800,391 | 4/1974 | Westbrook | 408/75 |
| 4,147,462 | 4/1979 | Appleby et al. | 408/83.5 |
| 4,365,917 | 12/1982 | Harmand | 408/115 R |
| 4,545,706 | 10/1985 | Hiroyasu et al. | 408/83.5 |
| 4,563,824 | 1/1986 | Baun | 33/644 |
| 4,630,977 | 12/1986 | Theofanous | 408/83.5 |

FOREIGN PATENT DOCUMENTS

| 0022796 | 11/1982 | European Pat. Off. . | |
| 2248180 | 4/1974 | Fed. Rep. of Germany | 408/75 |
| 0848973 | 7/1981 | U.S.S.R. | 33/520 |
| 0913032 | 3/1982 | U.S.S.R. | 33/520 |
| 1185058 | 10/1985 | U.S.S.R. | 33/644 |
| 613594 | 11/1948 | United Kingdom | 408/83.5 |

Primary Examiner—William A. Cuchlinski, Jr.
Assistant Examiner—Thomas B. Will
Attorney, Agent, or Firm—Thomas W. Speckman; Douglas H. Pauley

[57] ABSTRACT

A process and apparatus for centering a pilot shaft which is inserted into a valve guide of a valve seat to be machined, and serves therein as a guide mandrel for a rotary shaping tool. By electronically controlled drive mechanisms, the pilot shaft is supported in a central position by a swiveling ball maintained in a swivelable manner between two clamping shells, and is held between two displaceable clamping plates and centered in the valve guide. To center the pilot shaft, it is moved in two crossing directions by the drive mechanisms through the horizontal displacement of the clamping shells. The clamping shells are successively moved to their two end positions of their two crossing displacement directions. The displacement path lying between these end positions is electronically measured. The drive mechanisms then move the clamping shells into the electronically determined central position of the two measured displacement ranges.

19 Claims, 5 Drawing Sheets

PROCESS AND DEVICE FOR CENTERING A GUIDE MANDREL

BACKGROUND OF THE INVENTION

In the machining of valve seats, particularly in internal combustion engines, the highest precision of the valve seat is required. Valve seats are machined by turning, whereby the shaping tool serving as the rotary tool is guided on a pilot shaft, which serves as a guide mandrel in the valve guide of the valve for the valve seat to be machined. The snug fitting of the valve attained through this machining depends directly upon the snug fitting or position of the pilot shaft in the valve guide. Even with a nearly perfectly snug fitting of the pilot shaft, it is unavoidable that this has some clearance in the valve guide, even if only to a slight degree. This is particularly the case if the valve guide is somewhat deflected, and is thus extended in its diameter toward its ends. The present invention concerns a process and a device by means of which such a pilot shaft can be optimally centered in a valve guide, so that any possible clearance of the pilot shaft in the valve guide is averaged out.

Valve seats are conventionally machined with devices which have a support stand which is mounted on a magnetic flange. The magnetic flange has a flat support surface by means of which it can be set on a clamping plate, and can be fixed there in an immovable manner by means of magnetic forces. The support stand comprises a support column, on which a swivel arm is positioned in a height-adjustable manner. The swivel arm bears on its one end a support mount for a swivel ball, in which a pilot shaft intended to act as a guide mandrel is inserted. The pilot shaft can thereby be swiveled on all sides relative to the support mount, and can be fixed by means of the support mount in any chosen swivel position, which mount is for this purpose provided with a clamping device. A shaping tool is supported on the pilot shaft as a rotary tool. The turning of the rotary tool can take place by hand, but also with the aid of mechanical, pneumatic, hydraulic or electrical drive devices.

The device is now employed in accordance with a process in which the pilot shaft, in the detached condition of the swivel ball, is inserted into the valve guide. In this manner, the most closely fitting possible pilot shaft, which should have the least possible clearance in the valve guide, is used. After inserting the pilot shaft, the swiveling ball is clamped solidly in its support mount, and the support stand is then, by turning on the magnetic field of the magnetic flange, attached in an immovable manner to the clamping plate. With the rotating shaping tool, it is now smoothly brought down to the valve seat, and as much material is removed by turning as needed, until the shaping tool has evenly shaven away the valve seat material. It is, of course, to be understood that the pilot shaft in this process unavoidably has a certain clearance in the valve guide, within which it has a certain imprecision relative to its exact central position. If the valve guide is now additionally deflected, this clearance increases. Even if this only involves a few fractions of an angle of degree, such an imprecision of the pilot shaft, which should serve as the guide for the shaping tool, has a considerable effect on the later snug fitting of the valve in the valve seat to be machined.

As an auxiliary measure, certain devices are equipped with an air-supported magnetic flange, so that, upon inserting the pilot shaft, the frictional forces between the magnetic flange and the clamping plate are minimized. The magnetic flange hovering on an air cushion makes it possible for the pilot shaft in the valve guide to be able to occupy as stress-free a position as possible. If the magnetic flange at first no longer shifts on the clamping plate, it is fixed on the clamping plate by switching on the magnetic field. Even with this device, however, a certain clearance of the pilot shaft in the valve guide is unavoidable, particularly if the valve guide is still deflected. An optimal centering of the pilot shaft is thus unattainable by means of the conventional machining devices and the processes applied with them.

SUMMARY OF THE INVENTION

It is thus an object of the present invention to create a process and a device by means of which a pilot shaft serving as a guide mandrel in a valve guide can be optimally centered. By means of this more precise centering, the precision of the valve seat machined by means of the rotary shaping tool conducted on the pilot shaft should be increased.

These objects are obtained by means of a process for the centering of a pilot shaft serving as a guide mandrel in a valve guide for precision machining of a valve seat with a device for the guiding of the rotary shaping tool, the device comprising a pilot shaft fitting into the valve guide and passing through a swiveling ball, whereby the pilot shaft, by means of the swiveling ball, is positioned and supported so as to be displaceable and fixable on all sides in a support mounting on an arm of the guide device. The process comprises the steps: (a) displacing the pilot shaft back and forth through at least two crossing directions in succession outside the valve guide by means of an electronically controlled drive mechanism, measuring, storing and calculating a motion path between both end positions of a multiple sided horizontal displacement range of a respective support mounting by means of an electronic control unit, moving the pilot shaft into central positions of evenly dimensioned displacement ranges through movement of its support mounting by means of the drive mechanism which are controlled by the control unit; (b) inserting the pilot shaft into the valve guide of the valve seat which is to be machined, and attaching the arm of the device in a non-movable manner with respect to the valve seat; (c) moving the pilot shaft successively through at least two crossing directions back and forth in the overall horizontal displacement range of the support mounting by means of the electronically controlled drive mechanism thereby precisely centering the pilot shaft within the clearance of the valve guide, the pilot shaft moving within the clearance in the valve guide, measuring, storing and calculating the movement path between both end positions of the specific displacement range of the support mounting by means of the electronic control unit, moving the pilot shaft back into the central position of the evenly dimensioned displacement range through moving its support mounting by means of the drive mechanism, the drive mechanism being controlled by the control unit; and (d) clamping the pilot shaft solidly in its support mounting with clamping devices in an immovable manner, as a holder for a rotary shaping tool for the precision machining of the valve seat. In preferred embodiments, the displacement ranges of the support mounting in process steps (a) and (c) are measured by incremental disks, which are secured on and rotate with drive axes of electric motors the incremental disks having at a constant radius distance evenly spaced perforations, each perforation passing through a light beam directed parallel to the rotation axis of the incremental disks through which light beams are continuously opened and closed by the perforation of the solid disk corresponding to the rotation of the incremental disks producing photoelectrical pulses which are counted by the electronic control unit.

In step (a), this may be achieved by the electronic control unit directing drive mechanism, first starting a first displacement range in a first direction triggering movement inwardly until light barriers are crossed limiting the displacement range, reversing the inward motion to a movement outward, until light barriers are crossed limiting the displacement range in this direction, whereupon the control unit stops the movement outward, and during the movement outward, photoelectrical pulses produced through the rotation of incremental disks through the light beams are registered, counted and then halved by the electronic control unit, and initiating a new inward motion which stops when the control unit has again registered half the determined number of the previously registered light pulses, and the identical process is subsequently carried out for a second displacement range.

In step (c) this may be achieved by the electronic control unit directing drive device, first starting a first displacement range moving pilot shaft in the valve guide in a first direction on the basis of its free clearance, triggering movement inwardly until blocked in valve guide by cathing of pilot shaft blocking the movement inwardly, the control unit then initiates movement outwardly until movement outward is blocked by the catching of the pilot shaft in the valve guide, during said movement outwardly, the photoelectrical pulses, produced through rotation of incremental disk through the light beams are registered, counted and subsequently halved by the electronic control unit, and initiating a new movement inwardly, which stops when said control unit has again registered the determined half number of previously registered light pulses, and the identical process is subsequently carried out for a second displacement range.

A device for centering a guide mandrel comprising the support mounting which is supported in a swivelable and fixable manner on all sides on a swiveling arm, the swiveling arm positioned in a height-adjustable manner on a support stand having support column and magnetic flange which can be magnetically attached to a clamping plate. The support mounting of a swiveling ball comprises two opposing clamping shells and two clamping plates, the swiveling ball held supported by air in a rotatable and swivelable manner, between the clamping shells having concave clamping surfaces positioned parallel spaced from one another, the clamping shells being flat on the side turned away from swiveling ball, and are together supported on air in a displaceable manner between the two flat clamping plates. The swiveling ball, with pilot shaft positioned rotatably therein, can be clamped solidly between the clamping shells by means of compression of said clamping plates toward one another; drive mechanism capable of displacing the clamping shells, in the released condition, in two crossing directions, the drive mechanism for the displacements is provided with measuring devices, with which the displacement range can be electronically measured.

An electronic control unit is capable of calculating the measured displacement range and controlling the drive mechanism moving the pilot shaft precisely into the central position between both end positions of its displacement in the two displacement directions, and fixing it in the central position. In a preferred embodiment, the drive mechanism for each displacement direction comprises an electrical motor, a drive axis supported by means of a threading through a ball. The threaded ball, by means of a connecting rod, is connected in an articulated manner with at least one of said clamping shells. The displacement range of the clamping shells is provided by two swiveling ranges of the clamping shells around two swiveling axes which are spaced from one another, whereby one swiveling axis for a first swiveling range is formed by an articulated connection of a connecting rod of said drive mechanism for the second swiveling range of the clamping shell, and a swiveling axis for a first swiveling range is positioned on a swiveling arm in the central position of an articulated connection between the other connecting rod of the drive mechanism for a second swiveling range of the clamping shell. The measuring devices for the swivelings on the drive mechanism for each swiveling comprise, on the one hand, two end switches for both movement directions of the connecting rods, and a rotational range meter on each drive axis, by means of which the rotational range can be electronically measured.

In a preferred embodiment, the end switches each comprise a light barrier which is stationary relative to the swiveling arm, and directed perpendicularly to the connecting rod and cams radially protruding from the connecting rod or from the threaded ball, the cams upon crossing a light barrier, interrupt the photoelectrical beam and trigger a signal. The rotational range meter on each drive axis comprises a round incremental disk set centrally on the drive axis, the disk at a constant radius distance all around has regular perforations by which a light beam is continuously opened and closed corresponding to the rotation of the incremental disk.

BRIEF DESCRIPTION OF THE DRAWING

An example of the device in accordance with the invention is shown in the drawing wherein.

DESCRIPTION OF PREFERRED EMBODIMENTS

Figure 1:
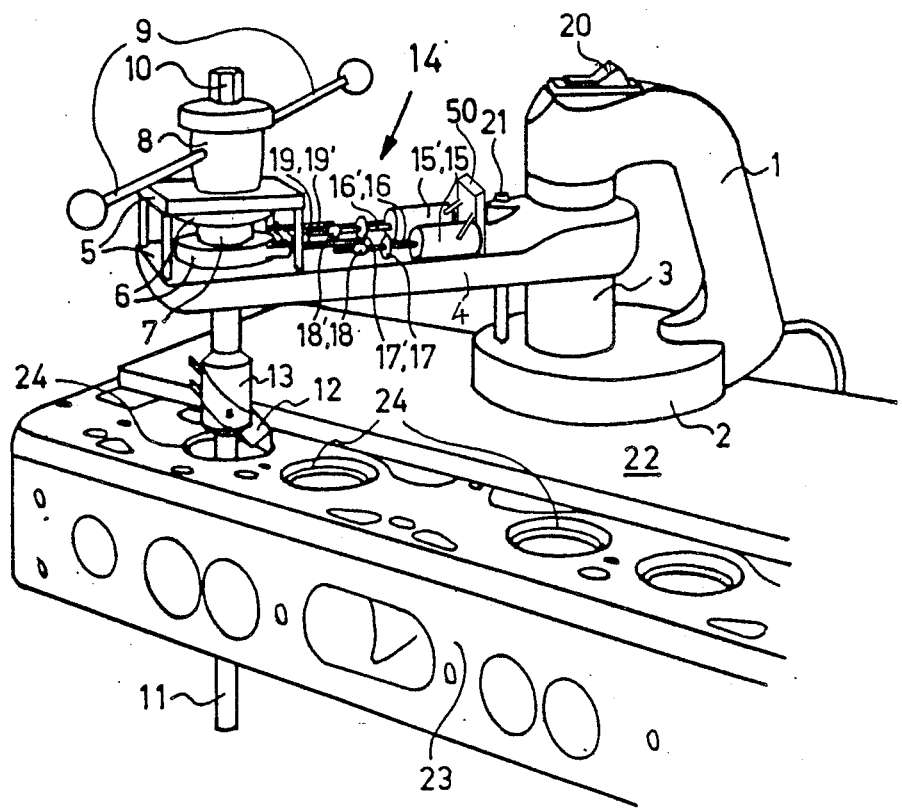
FIG. 1 is a perspective view of a device of this invention in its operational position.

A device for the execution of the process in accordance with the invention is shown in FIG. 1. It comprises a support stand (1) with a support column (3), which are both mounted on a magnetic flange (2). The magnetic flange (2) is flat on the bottom, and, in the operational position of the device, is placed on a clamping plate (22), on which it can easily be moved when the magnets are switched off. The electromagnet in conjunction with the magnetic flange (2) can be switched on and off by means of the toggle switch (20). A swiveling arm (4) is articulated on the support column (3). It can be adjusted in height on the support column (3) by means of the height adjustment screw (21). The pilot shaft (11) passes through the end of the swiveling arm (4). Pilot shaft (11) has a rotary tool mount (13), in which various rotary shaping tools (12) which are used to machine the valve seats, can be inserted. The cylinder head (23) having valve seats to be machined is clamped, top downward, below the clamping plate (22). The pilot shaft (11), which serves as the guide mandrel for the rotary shaping tool (12), is inserted into the valve guide (25) of the valve seat (24) which is to be machined.

What is now important for the invention is the connection of the mandrel (11) with the swiveling arm (4). As in a conventional device, the mandrel (11) is rotatably supported in a swiveling ball (7). This is now, however, not simply supported in a swivelable manner on all sides, as in conventional devices, but rather is additionally supported horizontally on all sides relatively displaceable to the swiveling arm (4). This maneuverability is created by means of two clamping shells (6), between which the swiveling ball (7) is swivelably supported. However, the clamping shells (6) are, for their part, supported in a displaceable manner, between two clamping plates (5). The lower clamping plate (5) is thus formed by the swiveling arm (4). It should be understood that the mandrel (11) is conducted through a correspondingly large bore hole of the swiveling arm (4). The size of this bore hole determines the displacement or even the swiveling range of the mandrel (11) or the swiveling ball (7). The same also applies for a corresponding bore hole in the upper clamping plate (5). The mandrel (11) can be fixed in an immovable manner in any chosen displacement and swiveling position. This fixing takes place through a clamping of both the clamping plates (5) toward one another. This clamping is attained by rotating a tightening screw (8) by using the tightening levers (9). Through the clamping of the clamping plates (5) toward one another, the clamping shells (6) with the swiveling ball (7) lying between them are clamped against one another.

The entire support of the swiveling ball (7) with the mandrel (11) extending into it is achieved by an air blanket. For this purpose, air is blown out through internal supply channels, through small openings on the internal and external clamping surfaces of both the clamping shells (6). This air then forms an air cushion between the clamping surfaces of clamping plates (5) and clamping shells (6), on the one hand, as well as between those of the clamping shells (6) and the swiveling ball (7), on the other hand. By means of the air support, it is attained that the swiveling ball (7) with the mandrel (11) supported by it is movable, in a manner practically free of friction, in its entire range of displacement and swiveling. For the rotation operation, the fixed mandrel (11) is set into rotation by means of the rotary nut (10). Hydraulic, mechanical, pneumatic or electrical drive mechanisms can serve this end. The clamping shells (6) are movable in their range of displacement by means of special drive mechanisms (14). These drive mechanisms (14) move the clamping shells by means of two different swiveling axes (30, 31) positioned perpendicularly to the plane of displacement. The paths of displacement thereby made possible therefore cross one another. The swiveling axes (30, 31) are each connected in an articulated manner with one threaded ball (18, 18') each by means of connecting rods (19, 19'). The drive shafts (16, 16') of two electrical motors (15, 15') are each provided with threads which extend into the threaded balls (18, 18'). The drive shafts (16, 16') are furthermore provided with incremental disks (17, 17'), the meaning and function of which will later be more precisely illustrated.

Figure 2:
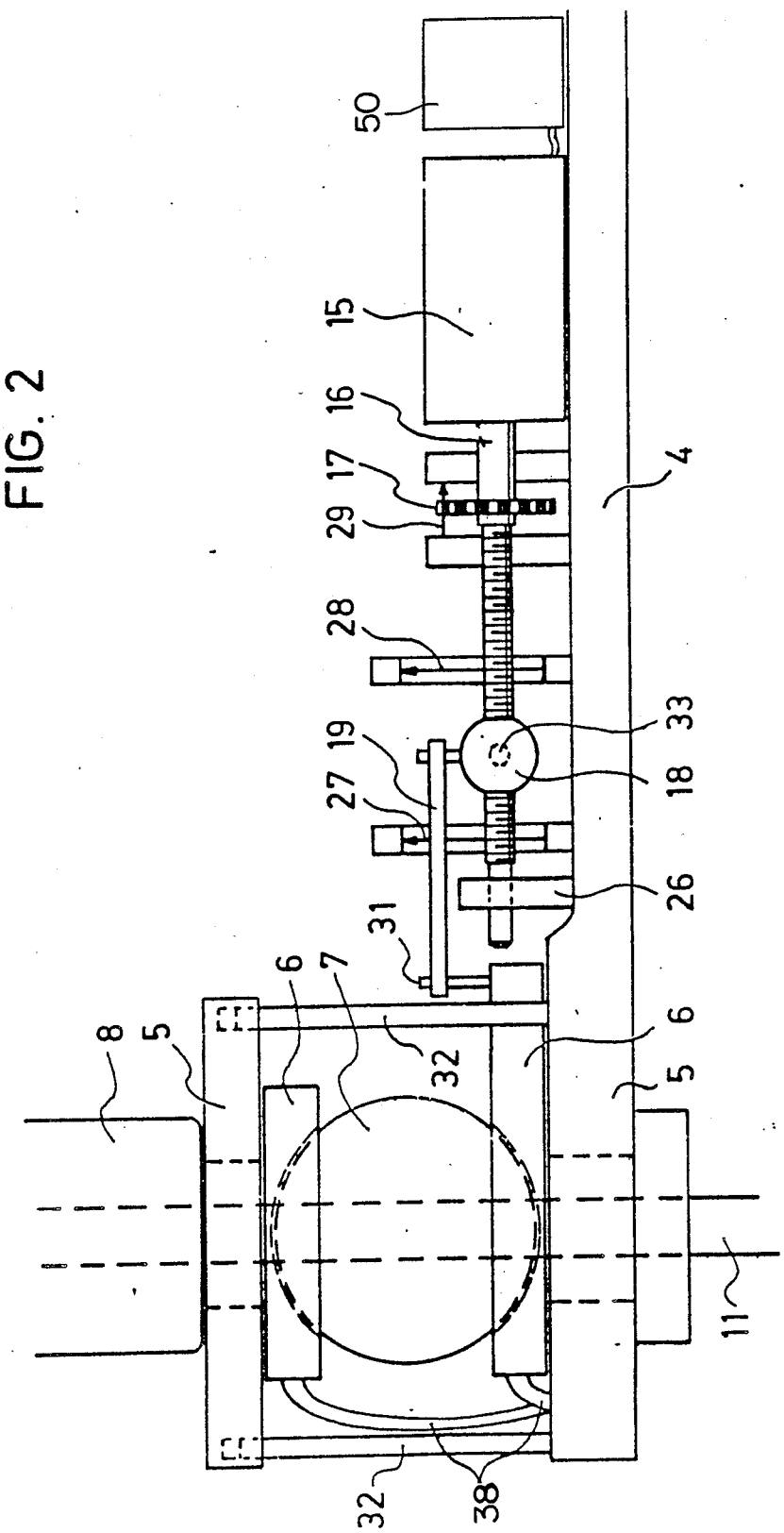
FIG. 2 is a side view of the drive mechanism for the centering movements of a device shown in FIG. 1.

FIG. 2 shows an enlarged side view of the drive mechanism (14). The lower clamping shell (6) abuts the swiveling arm (4), which, with the end of the swiveling arm (4), functions as a clamping plate (5). The swiveling ball (7), in which the mandrel (11) is supported in a rotatable manner, is inserted into the lower clamping shell (6). The upper clamping shell (6) is placed on the swiveling ball (7). The upper clamping plate (5), which is additionally conducted onto the guide supports (32), abuts the upper clamping shell (6). The tightening nut (8), which is provided with an internal threading, grips from above, by means of which nut the mandrel (11) can be clamped in a non-movable manner, since the swiveling ball (7) can be placed in its specific position between the clamping shells (6) and the clamping plates (5) placed under compression. The clamping shells (6) are, for the purpose of air support, provided with air by means of the tubes (38), The lower clamping shell (6) is displaceable relative to the swiveling arm (4), and connected in an articulated manner with the threaded ball (18) by means of the swiveling axis (31) and by means of a connecting rod (19). This displacement takes place by means of the threading of the drive shaft (16) of an electrical motor (15). The drive shaft (16) is supported with its end in a drive shaft support (26). With the threaded movement of ball (18), a cam (33) is also displaced horizontally. The displacement range of the threaded ball (18) is limited by two light beam detectors (27, 28), and the interruption of the light beam by the cam (33) releases corresponding control signals. The rotational range of the drive shaft (16) can be measured by means of the incremental disk (17), which, upon rotating, continuously interrupts a metering light beam (29) and again releases it, through which metering impulses arise and are registered by the control unit (50), which is not shown in FIG. 2.

Figure 3:
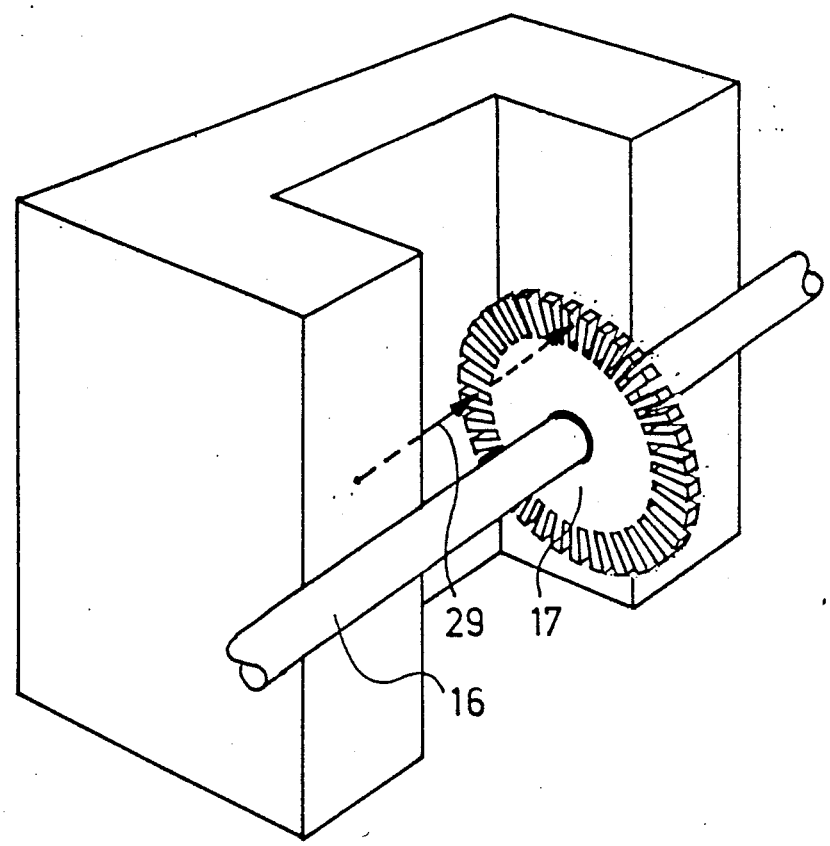
FIG. 3 is a perspective view of an incremental disk of a device shown in FIG. 1.

FIG. 3 shows an enlarged view of incremental disk (17). The incremental disk (17) rotates along with the drive shaft (16). The edge of the incremental disk (17) is interrupted with slots at regular distances. These slots run through the light beam (29) which is thereby continuously interrupted and released again. Instead of a regularly slotted or toothed edge, the incremental disk (17) can be perforated by holes at a constant radius distance. If the light beam is not interrupted, then a continuous photoelectrical process is maintained through the continuous interruption of which signal pulses are produced, which can be metered by the electronic control unit.

Figure 4:
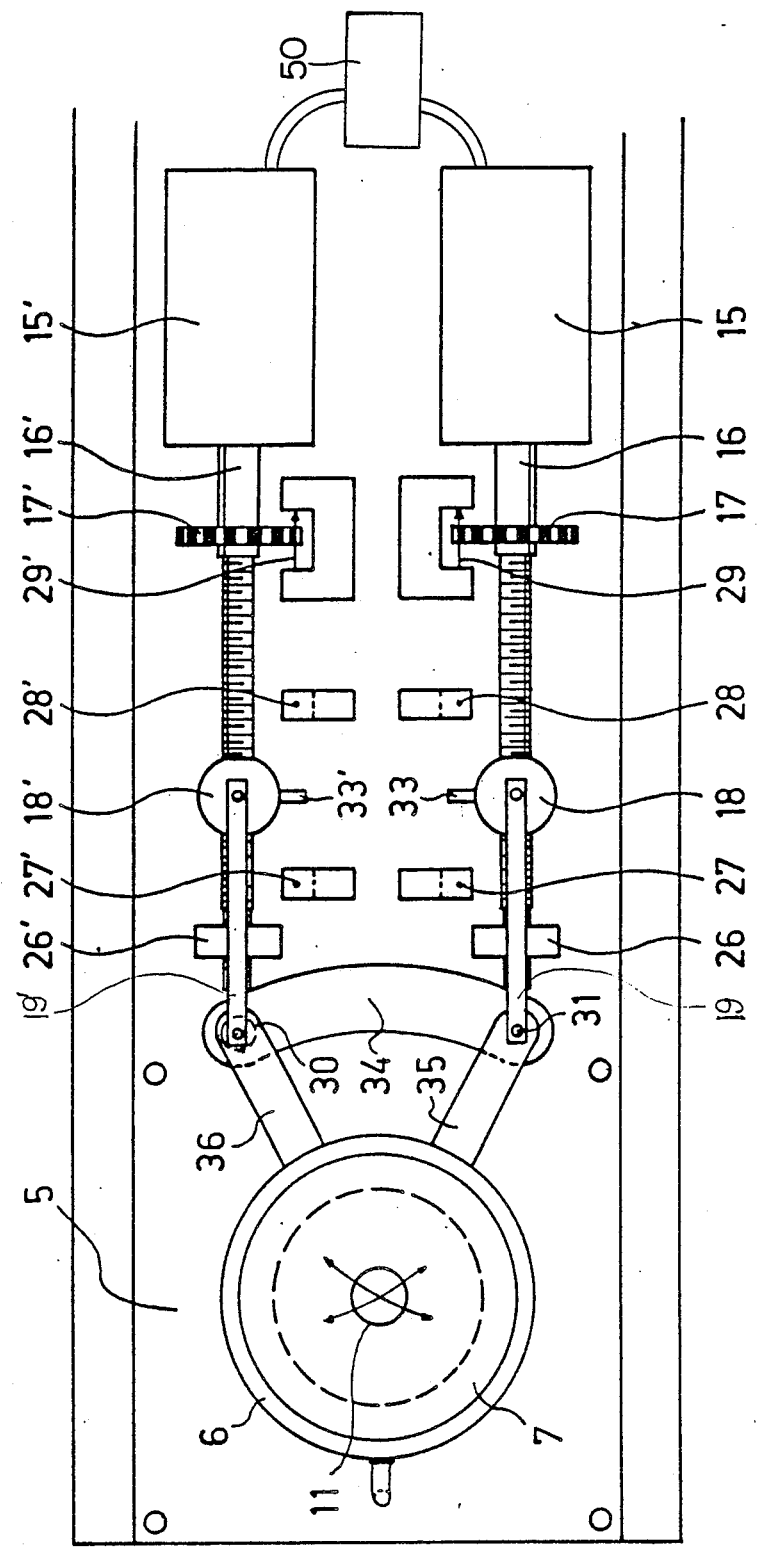
FIG. 4 is a top view of the drive mechanisms for the centering movements of a device shown in FIG. 1.

FIG. 4 shows the drive mechanism (14) in a top view. The parts which are essentially visible here have, with the exception of the precise arrangement of the swiveling axes (30, 31), already been individually described above under FIG. 2. In the present FIG. 4, the cams (33, 33') on the threaded balls (18, 18') are more clearly visible. These cams (33, 33') interrupt, with sufficiently great displacement on both sides, the light barriers (27, 27' and 28, 28') specifically placed there. The lower clamping shell (6) can be swiveled around two different swiveling axes (30 and 31). The swiveling axis (30) is solidly connected with the lower clamping plate (5) or the swiveling arm (4). The swiveling bracket (34) is positioned in a swivelable manner around swiveling axis (30), and is connected at its other end, in an articulated manner, with the connecting rod (19) and the swiveling lever (35), through which articulation the second swiveling axis (31) is formed. The swiveling lever (35) is solidly connected with the lower clamping shell (6). A second swiveling lever (36), likewise solidly connected with the lower clamping shell (6), is, by means of an articulation connected in a swivelable manner with the other connecting rod (19'), but, however, independently of the swiveling axis (30) which lies thereunder, which has already been described. The two arrows approximately indicate the two displacement directions, which are possible with the two swiveling axes (30, 31).

Figure 5:
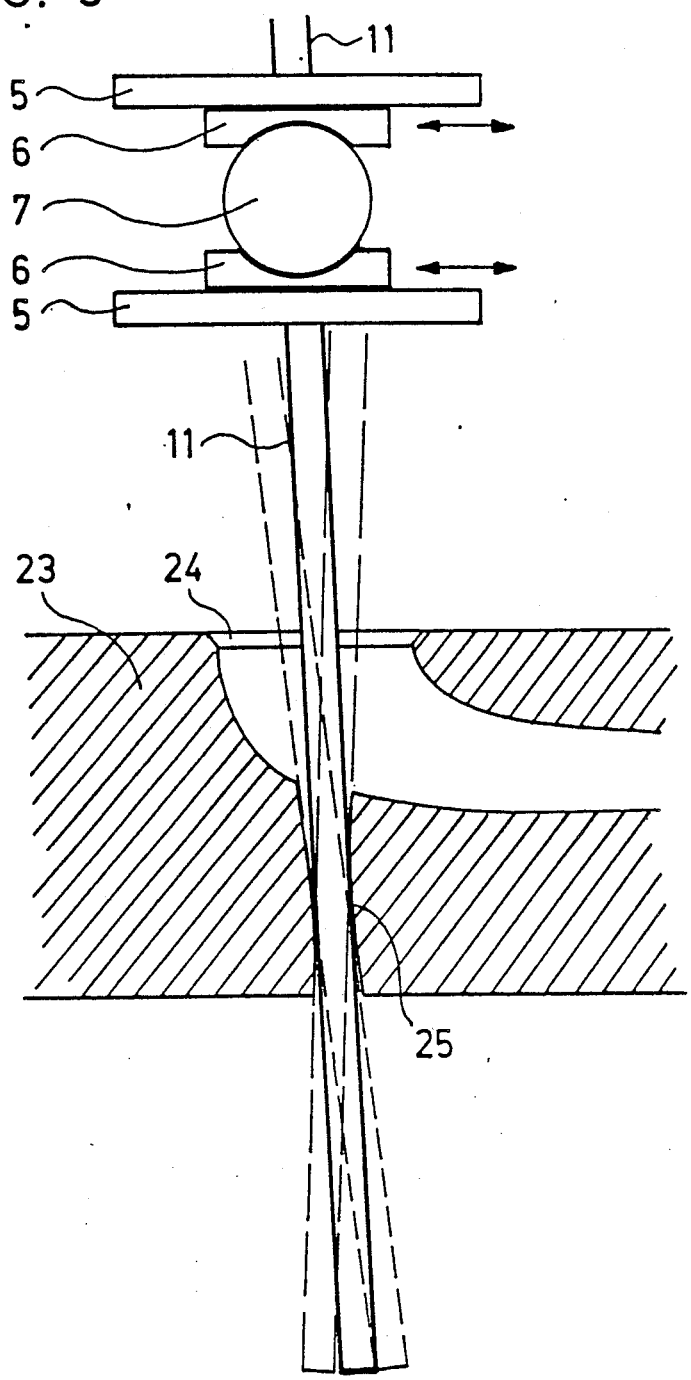
FIG. 5 is a schematic depiction of the pilot shaft of a device shown in FIG. 1 showing clearance in the valve guide.

FIG. 5 schematically shows how a pilot shaft (11) inserted into the valve guide (25) has clearance within the same. This clearance is due, on the one hand, to the fitting precision of the pilot shaft (11), which is always associated with error, and, on the other hand, however, to the deflection of the valve guide (25). Naturally, the clearance shown here is greatly exaggerated in its dimensions, in order to show the problem forming the basis of the invention more clearly. Within the clearance of the pilot shaft (11, which, in a device in accordance with the invention, certainly does not need to be selected to be too closely fitting, the pilot shaft (11) can now be averaged out over two crossing directions. Through this fact, any error which might possible arise in the position of the rotational plane, which the rotary shaping tool performing the machining describes, is averaged out.

The machining process in accordance with the invention proceeds, with the device described, in the following manner:

After the cylinder head (23) with the valves seats (24) to be machined has been so clamped that the valve seats (24) are directed upwardly, the clamping plate (22) is placed on and tightened with the cylinder head (23). The device is now, by means of the magnetic flange (2), placed onto the clamping plate (22) whereby the pilot shaft (11) projects downwardly into the open space. After the attachment of the magnetic flange (2) by switching on the corresponding magnetic field by means of the toggle switch (20), the pilot shaft (11) is first roughly centered by means of the process step (a). To this end, it is released in its support. The electronically controlled drive mechanisms (14) now displace the clamping shells (6) of the support mounting one after another in two crossing directions, and move the support mounting into the specific central positions. The range of displacement of the support mounting is limited by means of the light barriers (27, 28). First of all, the drive mechanisms (14) move the clamping shell (6) around the swiveling axis (30) through a movement inward to a first end position, which is attained through a crossing of the light barrier (27) by means of the cam (33). The displacement device is then reversed into a movement outwardly, whereby the path of motion to the other end position of the displacement range is measured. This takes place by the incremental disk (17) rotating along with the drive shaft (16) of the electrical motor (15), and thereby continuously interrupting the light beam (29), and again releases the same. The signal pulses thereby photoelectrically produced are counted by an electronic control unit, and the displacement is blocked by the crossing of the other light barrier (28). The control unit now determines half of the motion path by having the signal pulses counted. In the event of an uneven sum, a rounding up or down is carried out. The support mounting is then, by means of a renewed movement inwardly, moved around the axis (30) into the central position of the swiveling range. The control again takes place in this connection by means of the incremental disk (17), which makes the movement path countable by means of signal pulses until the determined pulse number has been attained, whereupon the electrical motor (15) is shut off. The identical process now occurs with the opposing drive mechanisms around the swiveling axes (31). The support mounting is thereby finally in the central position of its displacement range, which ensures that a determined clearance of the pilot shaft (11) can later be averaged out in every direction in the valve guide.

For the process step (b), the support mounting is advantageously braced, in order that forces arising on the pilot shaft not be transmitted to the fine drive mechanism. After the magnetic field has been shut off, the device is removed from the clamping plate, and the pilot shaft (11) is inserted into the valve guide (25) of the valve seat (24) which is to be machined. After releasing the support mounting of the pilot shaft (11), the magnetic field is again switched on, through which the magnetic flange (2) for the machining is attached in a non-movable manner onto the clamping plate (22).

During the process step (c), there now takes place the fine-centering of the pilot shaft (11) in the valve guide (25). In this, the support mounting of the pilot shaft (11) is released so that it can move, while supported by air, in a manner as free from friction as possible. The centering takes place identically as the rough centering which was described under process step (a). The displacement range is naturally not now limited by the light beam but rather by the specific catching points of the pilot shaft (11) in the valve guide. The control unit correspondingly blocks the displacements, as soon as it registers that the incremental disks (17, 17') are no longer rotating.

The process for rough and fine centering can, however, also so proceed that the pilot shaft starts through a corresponding displacement of the support mounting of the edge of its displacement range, that is to say, its range of clearance, and this movement curve is electronically measured, stored and calculated. The movement of this edge can take place by means of drive mechanisms, which are connected in a longitudinally and laterally flexible manner with the support mounting. The movements, which are approximately circular, and are as a rule ellipsoid can, for example by means of two potentiometers which are each controlled through the x- and y-deflection, be determined through the superimposition of the measuring currents. The measuring currents for the central position are then determined with the electronic control unit, which currents, during the centering with the given drive mechanisms, can serve as characterizing values.

Finally, the support mounting of the pilot shaft (11) is, as step (d), braced with the clamping devices in a solid and unmovable manner. It can now serve as a guide for the rotary shaping tool (12) which is fastened to it, by means of which the precision machining of the valve seat (24) can now be undertaken. With the process in accordance with the invention, a pilot shaft (11) can be centered very precisely in a valve guide. The application is reproducible, and no more differences in precision are present, as was previously unavoidably the case. The invention makes possible a level of precise machining of valve seats which was previously unattainable.

I claim:

1. A process for the centering of a pilot shaft (11), serving as a guide mandrel in a valve guide (25), for a precision machining of a valve seat (24), with a device for guiding a rotary shaping tool (12), said device comprising said pilot shaft (11) fitting into said valve guide (25) and passing through a swiveling ball (7), whereby said pilot shaft (11), by means of said swiveling ball (7), is positioned and supported so as to be displaceable and fixable on all sides in a support mounting on an arm (4) of said device, said process comprising the steps:

(a) displacing said pilot shaft (11) back and forth through at least two crossing directions in succession outside said valve guide (25) by means of an electronically controlled drive mechanism (14), measuring, storing and calculating a motion path between both end positions of a horizontal displacement range of a respective support mounting by means of an electronic control unit, moving said pilot shaft (11) into central positions outside said valve guide of calculated displacement ranges by movement of said respective support mounting by means of said drive mechanism (14) which are controlled by said control unit;

(b) inserting said pilot shaft (11) into said valve guide (25) of said valve seat (24), and attaching the arm (4) of said device in a non-movable manner with respect to said valve seat (24);

(c) moving said pilot shaft (11) successively through at least two crossing directions back and forth in an overall horizontal displacement range of the support mounting by means of said electronically controlled drive mechanism (14) thereby centering said pilot shaft (11) within a clearance in said valve guide (25), said pilot shaft (11) moving within the clearance in said valve guide (25), measuring, storing and calculating the motion path between both said end positions of the specific displacement range of the support mounting by means of said electronic control unit, moving said pilot shaft (11) back into the central position of a previously dimensioned displacement range through moving its support mounting by means of said drive mechanism (14), said drive mechanism being controlled by said control unit; and (d) clamping said pilot shaft (11) solidly in said respective support mounting with clamping devices in an immovable manner, as a holder for said rotary shaping tool (12) for the precision machining of said valve seat (24).

2. A process in accordance with claim 1, wherein said process step (a) wherein swiveling said support mounting over said displacement range is by means of said drive mechanism (14) in succession swiveling on two swiveling axis (30, 31) which are spaced apart, whereby swiveling ranges are bounded on both ends by each said support mounting interrupting first or second light barriers (27, 28, 27', 28').

3. A process in accordance with claim 2, wherein said displacement ranges of said support mounting are measured by incremental disks (17, 17'), which are secured on and rotate with drive shafts (16, 16') of electric motors (15, 15'), each of said incremental disks (17, 17') having at a constant radius distance evenly spaced perforations, each said perforation passing through one of light beams (29, 29') which are directed parallel to a rotational axis of said incremental disks (17, 17'), through which the light beams (29, 29') are continuously opened and closed by each said perforation corresponding to rotation of the incremental disks (17, 17') producing photoelectrical pulses which are counted by the electronic control unit.

4. A process in accordance with claim 3, wherein said control of said process step (a) is by means of the electronic control unit directing said drive mechanism (14), first starting a first displacement range in a first direction triggering movement inwardly until said first light barriers (27, 27') are crossed limiting the first displacement range reversing the inward motion to a movement outward, until said second light barriers (28, 28') are crossed limiting the first displacement range in this direction, whereupon said control unit stops the movement outward, and during said movement outward, said photoelectrical pulses are halved by the electronic control unit, sand initiating a new inward motion which stops when said control unit has again registered half a determined number of the previously registered said photoelectrical pulses, and an identical process is subsequently carried out for a second displacement range.

5. A process in accordance with claim 4, wherein said process step (c) is by means of the electronic control unit directing said drive device (14), first starting said first displacement range moving said pilot shaft (11) in said valve guide (25) in said first direction within a free clearance, triggering movement inwardly until blocked in said valve guide (25) by catching of said pilot shaft (11) blocking the movement inwardly, the control unit then initiating movement outwardly until the movement outward is blocked by catching said pilot shaft (11) in said valve guide (25), during said movement outward, the photoelectrical pulses, produced through rotation of said incremental disks (17, 17') through said light beams (29, 29') are registered, counted and subsequently halved by the electronic control unit, and initiating the new movement inwardly, which stops when said control unit has again registered said determined half number of previously registered said photoelectrical pulses, and said identical process is subsequently carried out for the second displacement range.

6. A process in accordance with claim 1, wherein said displacement ranges of said support mounting are measured by incremental disks (17, 17'), which are secured on and rotate with said drive shafts (16, 16') of said electric motors (15, 15'), said incremental disks (17, 17') having at a constant radius distance evenly spaced perforations, each said perforation passing through one of light beams (29, 29') directed parallel to a rotational axis of each said incremental disks (17, 17'), through which said light beams (29, 29') are opened and closed by said evenly spaced perforations producing photoelectrical pulses which are counted by the electronic control unit.

7. A process in accordance with claim 1, wherein said control of said process step (a) is by means of said electronic control unit directing said drive mechanism (14), first starting a first displacement range in a first direction triggering movement inwardly until first light barriers (27, 27') are crossed limiting the displacement range reversing an inward motion to a movement outward, until second light barriers (28, 28') are crossed limiting the displacement range in said movement outward, whereupon said control unit stops the movement outward, and during said movement outward, photoelectrical pulses produced through the rotation of incremental disks (17,17') through light beam (29, 29') are registered, counted and then halved by the electronic control unit, and initiating a new inward motion which stops when said control unit has again registered half a determined number of the previously registered said photoelectrical pulses, and an identical process is subsequently carried out for a second displacement range.

8. A process in accordance with claim 1, wherein said process step (c) is by means of the electronic control unit directing said drive mechanism (14), first starting a first displacement range moving said pilot shaft (11) in said valve guide (25) in a first direction within a free clearance, triggering movement inwardly until blocked in said valve guide (25) by catching of said pilot shaft (11) blocking the movement inwardly, the control unit then initiating movement outwardly until a movement outward is blocked by catching said pilot shaft (11) in said valve guide (25), during said movement outward photoelectrical pulses, produced through rotation of incremental disks (17, 17') through light beams (29, 29') are registered, counted and subsequently halved by the electronic control unit, and initiating a new movement inwardly, which stops when said control unit has again registered a determined half number of previously registered said photoelectrical pulses, and an identical process is subsequently carried out for a second displacement range.

9. A process in accordance with claim 2, wherein said control of said process step (a) is by means of said electronic control unit directing said drive mechanism (14), first starting a first displacement range in a first direction triggering movement inwardly until first light barriers (27, 27') are crossed limiting the displacement range reversing an inward motion to a movement outward, until second light barriers (28, 28') are crossed limiting the displacement range in said movement outward, whereupon said control unit stops the movement outward, and during said movement outward, photoelectrical pulses produced through the rotation of incremental disks (17, 17') through light beam (29, 29') are registered, counted and then halved by the electronic control unit, and initiating a new inward motion which stops when said control unit has again registered half a determined number of the previously registered said photoelectrical pulses, and an identical process is subsequently carried out for a second displacement range.

10. A process in accordance with claim 2, wherein said process step (c) is by means of said electronic control unit directing said drive mechanism (14), first starting a first displacement range moving said pilot shaft (11) in said valve guide (25) in a first direction within a free clearance, triggering movement inwardly until blocked in said valve guide (25) by catching of said pilot shaft (11) blocking the movement inwardly, the control unit then initiating movement outwardly until a movement outward is blocked by catching said pilot shaft (11) in said valve guide (25), during said movement outward, the photoelectrical pulses, produced through rotation of incremental disks (17, 17') through the light beams (29, 29') are registered, counted and subsequently halved by the electronic control unit, and initiating a new movement inwardly, which stops when said control unit has again registered a determined half number of previously registered said photoelectrical pulses, and an identical process is subsequently carried out for a second displacement range.

11. A process in accordance with claim 3, wherein said process step (c) is by means of the electronic control unit directing said drive mechanism (14), first starting a first displacement range moving said pilot shaft (11) in said valve guide (25) in a first direction within a free clearance, triggering movement inwardly until blocked in said valve guide (25) by catching of said pilot shaft (11) blocking the movement inwardly, the control unit then initiating movement outwardly until a movement outward is blocked by catching said pilot shaft (11) in said valve guide (25), during said movement outward, the photoelectrical pulses, produced through rotation of said incremental disks (17, 17') through said light beams (29, 29') are registered, counted and subsequently halved by the electronic control unit, and initiating a new movement inwardly, which stops when said control unit has again registered a determined half number of previously registered said photoelectrical pulses, and an identical process in subsequently carried out for a second displacement range.

12. A device for centering a pilot shaft (11) serving as a guide mandrel comprising a support mounting of which is mounted in a swivelable manner on all sides on a swiveling arm (4), said swiveling arm (4) positioned in a height-adjustable manner on a support stand (1) having support column (3) and a magnetic flange (2) which can be magnetically attached to a clamping plate (22), a swiveling ball (7) rotatably and swiveledly mounted between two opposing clamping shells (6) and two clamping plates (5), said clamping shells (6) having concave clamping surfaces positioned parallel and spaced from one another, said clamping shells (6) being flat on a side turned away from said swiveling ball (7) and supported in a displaceable manner between said two clamping plates (5), said swiveling ball (7) with said pilot shaft (11) positioned rotatably within said swiveling ball (7) can be clamped solidly between said clamping shells (6) by means of compression of said clamping plates (5) toward one another; a drive mechanism (14) capable of displacing said clamping shells (6), in a released condition, in two crossing directions, said drive mechanism (14) having measuring devices, with which for electronically measuring a displacement range; and an electronic control unit capable of calculating a measured displacement range and controlling said drive mechanism (14) moving said pilot shaft (11) precisely into a central position between both end positions of a displacement of said pilot shaft (11) in two displacement directions, and fixing said pilot shaft (11) in said central position.

13. A device in accordance with claim 12, wherein said drive mechanism (14) for each displacement direction comprises an electrical motor (15, 15'), a drive shaft (16, 16') mateably engageable within a threaded through hole of a ball (18, 18'), said ball (18, 18') by means of connecting rods (19, 19'), is connected in an articulated manner with at least one of said clamping shells (6), said displacement range of said clamping shells (6) is provided by two swiveling ranges of said clamping shells (6) around a first swiveling axis (30) and a second swiveling axis (31) which are spaced from one another, whereby said second swiveling axis (31) for a first swiveling range is formed by an articulated connection of said connecting rod (19) of said drive mechanism (14) for a second swiveling range of said clamping shell (6), and said first swiveling axis (30) for said first swiveling range is positioned on a swiveling arm (4) in a center position of an articulated connection between connecting rod (19') of said drive mechanism (14) for said second swiveling range of said clamping shell (6).

14. A device in accordance with claim 13, wherein said measuring devices for said first swiveling range and said second swiveling range on said drive mechanism (14) comprise two end switches for said two crossing directions of said connecting rods (19, 19'), and a rotational range meter on each said drive shaft (16, 16'), by means of which a rotational range can be electronically measured.

15. A device in accordance with claim 14, wherein said end switches each comprise one light barrier (27, 28; 27', 28') which is stationary relative to said swiveling arm (4), and directed perpendicular to said connecting rod (19, 19') and cams (33, 33') radially protruding from one of said connecting rod (19, 19') and a threaded ball (18, 18'), said cams (33, 33') upon crossing said light barrier (27, 28; 27', 28'), interrupt a photoelectrical beam and trigger a signal.

16. A device in accordance with claim 14, wherein said rotational range meter on each of said drive shafts (16, 16') comprises a round incremental disk (17, 17') centrally mounted on said drive shaft (16, 16'), said incremental disk (17, 17') at a constant radius distance all around has a regular perforation by which a light barrier (29, 29') is opened and closed corresponding to the rotation of said incremental disk (17, 17').

17. A device in accordance with claim 12, wherein said measuring devices on said drive mechanism (14) comprise two end switches for both movement directions of said connecting rods (19, 19'), and a rotational range meter on each of said drive shafts (16, 16'), by means of which a rotational range can be electronically measured.

18. A device in accordance with claim 17, wherein said end switches each comprise one light barrier (27, 28; 27', 28') which is stationary relative to said swiveling arm (4), and directed perpendicular to said connecting rod (19, 19') and cams (33, 33') radially protruding from one of said connecting rod (19, 19') and a threaded ball (18, 18'), said cams (33, 33') upon crossing said light barrier (27, 28; 27', 28'), interrupt a photoelectrical beam and trigger a signal.

19. A device in accordance with claim 17, wherein said rotational range meter on each of said drive shafts (16, 16') comprises a round incremental disk (17, 17') centrally mounted on said drive axis, said incremental disk (17, 17') at a constant radius distance all around has a regular perforation by which said light barrier (29, 29') is opened and closed corresponding to the rotation of said incremental disk (17, 17').

* * * * *